United States Patent [19] [11] Patent Number: 5,985,163
Cha et al. [45] Date of Patent: Nov. 16, 1999

[54] PARTIALLY ETCHED PROTECTIVE OVERCOAT FOR A DISK DRIVE SLIDER

[75] Inventors: Ellis Taeho Cha, Santa Clara; Jia-Kuen Jerry Lee, San Jose; Luis P. Franco, Gilroy; Michael L. Workman, Saratoga, all of Calif.

[73] Assignee: Seagate Technology, Inc., Scotts Valley, Calif.

[21] Appl. No.: 08/891,506

[22] Filed: Jul. 11, 1997

Related U.S. Application Data

[62] Division of application No. 08/359,104, Dec. 19, 1994, abandoned.

[51] Int. Cl.$^6$ ............................................. G11B 5/127
[52] U.S. Cl. ..................................... 216/22; 216/81
[58] Field of Search ........................ 216/22, 72, 74, 216/81

[56] References Cited

U.S. PATENT DOCUMENTS

| | | | |
|---|---|---|---|
| 3,573,768 | 4/1971 | Harris | 340/174.1 |
| 5,022,959 | 6/1991 | Itoh et al. | 216/81 |
| 5,067,037 | 11/1991 | Ananth et al. | 360/103 |
| 5,159,508 | 10/1992 | Grill et al. | 360/103 |
| 5,198,934 | 3/1993 | Kubo et al. | 360/104 |
| 5,231,613 | 7/1993 | Nakayama et al. | 369/13 |
| 5,271,802 | 12/1993 | Chang et al. | 216/22 |
| 5,336,550 | 8/1994 | Ganapathi et al. | 428/216 |
| 5,345,353 | 9/1994 | Krantz et al. | 360/103 |
| 5,388,017 | 2/1995 | Franco et al. | 360/103 |

FOREIGN PATENT DOCUMENTS

| | | | |
|---|---|---|---|
| 56-77949 | 6/1981 | Japan | G11B 17/32 |
| 59-177376 | 8/1984 | Japan | C23F 1/00 |
| 61-177693 | 8/1986 | Japan | G11B 21/21 |
| 61-260481 | 11/1986 | Japan | G11B 21/21 |
| 62-31016 | 2/1987 | Japan | G11B 5/60 |
| 62-057119 | 3/1987 | Japan | G11B 5/31 |
| 63-292473 | 11/1988 | Japan | G11B 21/21 |
| 1-171101 | 7/1989 | Japan | G11B 5/02 |
| 2-230574 | 9/1990 | Japan | G11B 21/21 |
| 3-250416 | 11/1991 | Japan | G11B 5/31 |
| 4-181578 | 6/1992 | Japan | G11B 21/21 |
| 6-89523 | 9/1992 | Japan | G11B 21/21 |
| 4-302813 | 10/1992 | Japan | G11B 5/60 |
| 5-282646 | 10/1993 | Japan | G11B 5/60 |
| 6-139506 | 5/1994 | Japan | G11B 5/02 |
| 6-275037 | 9/1994 | Japan | G11B 21/21 |

*Primary Examiner*—Bruce Breneman
*Assistant Examiner*—Anita Alanko
*Attorney, Agent, or Firm*—Flehr Hohbach Test Albritton & Herbert LLP

[57] ABSTRACT

For use in a disk drive, a head comprising a slider having a bottom air bearing surface, a leading edge and a trailing edge; a magnetic transducer mounted by the slider at the trailing edge of the slider; and a protective overcoat adhered to the air bearing surface of the slider and having a leading edge and a trailing edge. The trailing edge of the protective overcoat being spaced from the trailing edge of the slider such that the minimum distance from the slider to the surface of a disk in the disk drive is between the magnetic transducer and the disk surface. A method for manufacturing a slider with an overcoat spaced from the trailing edge of the slider includes applying a carbon overcoat to the entire bottom air bearing surface, masking, and oxygen plasma etching exposed portions of the overcoated.

8 Claims, 3 Drawing Sheets

PARTIALLY ETCHED PROTECTIVE OVERCOAT FOR A DISK DRIVE SLIDER

This is a divisional of application Ser. No. 08/359,104 filed Dec. 19, 1994 now abandoned.

FIELD OF THE INVENTION

The present invention is directed to disk drives. More particularly, the present invention provides a new and improved arrangement and configuration for a protective overcoat for a slider used in the disk drive. The present invention achieves the advantages of a protective overcoat during contact start and stop operations of the disk drive, to protect a magnetic transducer mounted by the slider, while maintaining the magnetic spacing between a disk surface and the magnetic transducer at the same levels obtainable when using a slider not having a protective overcoat.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

A head includes an interactive element, such as a magnetic transducer, that is used to sense the magnetic transitions to read data, or to generate an electric current that causes a magnetic transition on the disk surface, to write data. The magnetic transducer includes a read/write gap that contains the active elements of the transducer at a position suitable for interaction with the magnetic surface of the disk.

The head further comprises a slider that mounts the transducer to a rotary actuator arm. The actuator arm operates to selectively position the head, including the transducer and slider, over a preselected data track of the disk to either read data from or write data to the preselected data track of the disk, as the disk rotates below the transducer.

The slider is configured to include an air bearing surface that causes the head, and thus the transducer, to fly above the data tracks of the disk surface due to interaction between the air bearing surface of the slider and fluid currents that result from the rotation of the disk. The amount of distance that the transducer flies above the disk surface is referred to as the "fly height." In known disk drive systems, the air bearing surface pivots the slider in the pitch direction and causes the leading edge of the head to rise to a higher level than the trailing edge. Accordingly, the fly height of the head varies from the leading edge to the trailing edge, with the minimum fly height occurring at the trailing edge. The read/write gap is typically mounted at the trailing edge of the slider.

As should be understood, due to operation of the air bearing surface, the transducer does not physically contact the disk surface during normal read and write operation of the disk drive. However, it is generally an objective to achieve an overall fly height that brings the read/write gap of the transducer as close to the disk surface as possible. For example, a Transverse Pressure Contour (TPC) head can be designed to operate at a fly height that is approximately $2 \mu$ inches above the disk surface.

The closer the active read/write gap of the transducer is brought to the surface of the disk, the stronger the electric signal generated by the transducer due to a magnetic transition on the disk surface which represents data. It is generally advantageous to develop as strong a data signal as possible, to insure reliable electrical performance of the disk drive.

When the disk drive is not operating, the rotation of the storage disk is stopped, and the air bearing surface of the head does not act to cause the transducer to fly. Under such circumstances, the head, including the transducer, comes to rest on the disk surface. Typically, the actuator is operated prior to power down of the disk drive, to position the head over a landing zone provided on the disk surface away from any of the data tracks. In a known contact stop operation of a disk drive, the head comes into contact with the disk surface upon the slowdown and cessation of rotation of the storage disk, after the actuator arm has positioned the head over the landing zone. The use of a landing zone prevents any damage to data tracks that may occur due to contact between the head and the disk surface. However, any contact between the transducer and the disk surface may result in damage to the transducer.

This is particularly true when the disk drive is started again in a contact start operation. A contact start operation causes the commencement of rotation of the disk while the head is still in contact with the landing zone. Stiction between the head and the landing zone, which resists separation between the head and disk surface, can be highly detrimental to the transducer mounted by the head. Indeed, the stiction between the disk surface and the head can be so significant that the air bearing surface cannot lift the head from the disk surface, even at the highest rotational velocity of the disk.

A protective overcoat, such as a layer of carbon, can be applied to each of the disk surface and the air bearing surface of the slider. It has been found that such a protective layer provides significant advantages in protecting the transducer from damage due to contact with the head structures, particularly during contact stop and start operations, leading to a more reliable mechanical performance of the disk drive.

As noted above, the transducer is mounted within the slider at the trailing edge, with the active read/write gap of the transducer exposed at the air bearing surface of the slider. In this manner, the transducer is positioned as close to the disk surface as possible. However, the application of a protective overcoat to the air bearing surface of the slider increases the thickness of the slider below the read/write gap, resulting in an increase in the effective fly height of the read/write gap of the transducer during operation of the disk drive. Accordingly, there is a trade off between improved mechanical performance achieved by the application of a protective coating and diminished electrical performance due an increase in the effective fly height of the read/write gap of the transducer.

SUMMARY OF THE INVENTION

The present invention provides a new and improved configuration for a protective overcoat applied to the air bearing surface of a slider. More particularly, the protective coating is applied to the air bearing surface as a layer having a length that is less than the length of the slider, with the trailing edge of the protective coating being spaced from the trailing edge of the slider. In this manner, the protective overcoat is present at the forward portions only of the slider, and the thickness of the slider below the read/write gap of the transducer is not impacted by the presence of the protective coating.

Since the trailing edge of the head is at the lowest end of the slider during fly height operation, the absence of the protective coating at the trailing edge of the slider permits the minimum fly height to be set at the same level that can be achieved without the protective coating.

Accordingly, the present invention accomplishes the advantageous mechanical protection desirable to minimize disk failure that can be caused by head/disk contact start and stop operations, in a manner that permits an effective low fly height operation that brings the read/write gap of the transducer as close as possible to the magnetic transitions recorded on the disk surface, irrespective of the use of a protective overcoat. During a contact stop operation of the disk drive, the leading edge of the slider will pivot toward the disk surface faster than the trailing edge, such that the protective coating contacts the surface of the landing zone, and the transducer is spaced above the disk surface by the coating.

DETAILED DESCRIPTION

Figure 1:
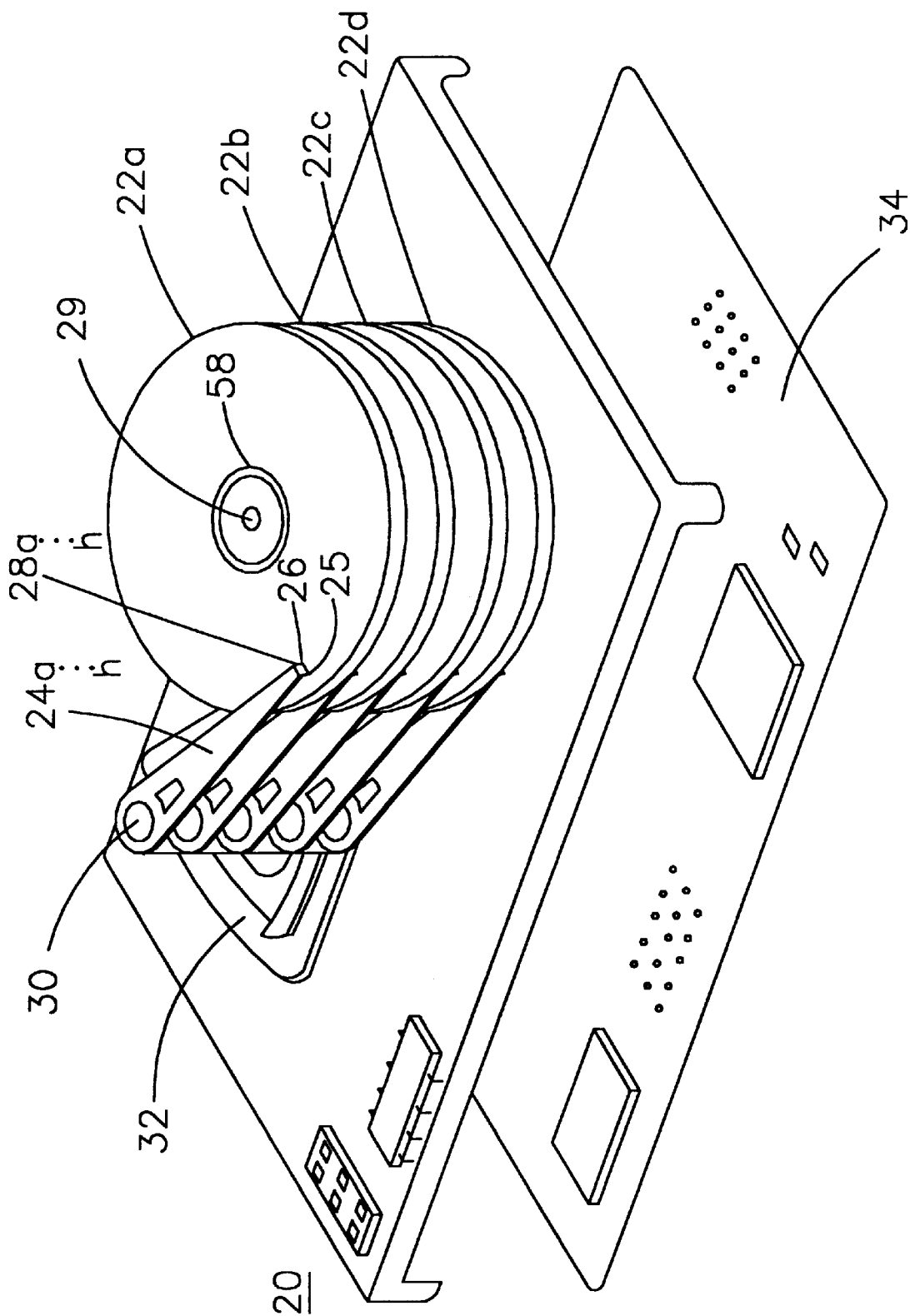
FIG. 1 is perspective view of a disk drive.

Referring now to the drawings, and initially to FIG. 1, there is illustrated a disk drive designated generally by the reference numeral 20. The disk drive includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads comprises a magnetic transducer 25 mounted to a slider 26. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h to position the read/write heads 24a–h over a respective landing zone 58, where the read/write heads 24a–h come to rest on the storage disk surfaces.

A printed circuit board (PCB) 34 is provided to mount control electronics for controlled operation of the spindle motor 29 and the voice coil motor 32. The PCB 34 also incudes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
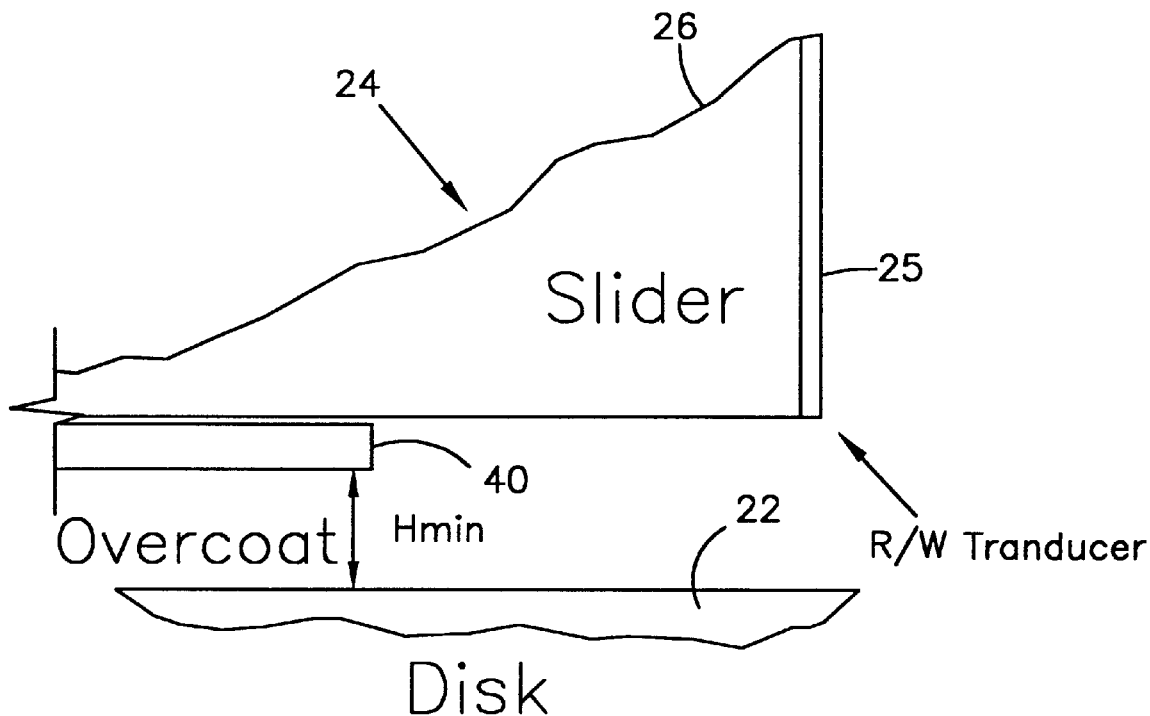
FIG. 2 is an exploded view of a portion of one of the heads of FIG. 1, in a horizontal position.

FIG. 2 shows the head 24a–h when the disk 22a–d first starts to rotate at the commencement of operation of the disk drive. At this time, the head 24a–h is initially nearly horizontal relative to the disk surface, (i.e. as the slider first lifts off the disk surface, the pitch angle θ of the slider 26, as measured form the disk surface, is small, positioning the slider 26 nearly horizontal relative to the disk surface).

According to the present invention, a protective overcoat 40, e.g. carbon, is applied to the lower air bearing surface of the slider 26 such that a trailing edge 42 of the overcoat 40, relative to the direction of rotation of the disk 22a–d, is spaced from a trailing edge 44 of the slider 26 by a distance x.

In the position of the slider 26 shown in FIG. 2, the minimum distance, Hmin, from the lowest portion of the slider air bearing surface, including the protective overcoat 40, is the distance d between the protective overcoat 40 and the disk surface. The transducer 25 is mounted within the slider 26 at the trailing edge 44. Thus, the transducer 25 is spaced from the disk surface at a distance hg that is grater than Hmin, and not as close to the disk surface as it would be without the protective overcoat 40. However, in the event of contact between the slider 26 and the disk surface, as during contact stop or start operations, the protective overcoat 40 will physically contact the disk surface to minimize any potential damage to the transducer 25.

Figure 3:
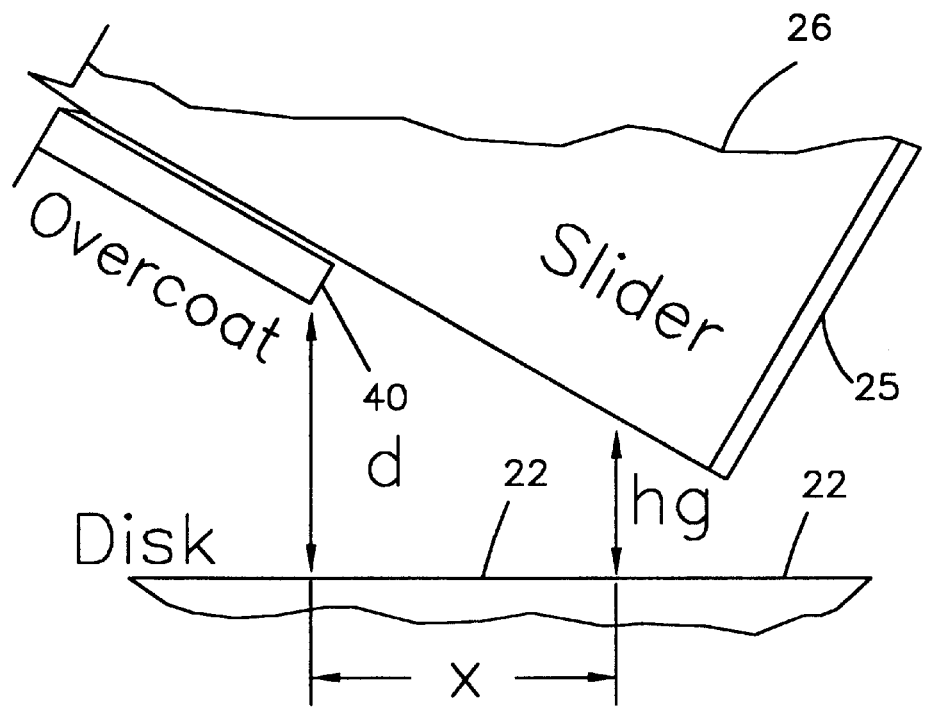
FIG. 3 is an exploded view of a portion of the head of FIG. 2, in a tilted position.

When the rotation of the disk 22a–d increases to its operating rotational velocity, the angle θ increases and the pitch of the slider 26 is more pronounced, as illustrated in FIG. 3. When the pitch angle θ is increased, the distance d between the protective overcoat 40 and the disk surface is greater than the distance hg between the trailing edge of the slider 26, where the transducer 25 is mounted, and the disk surface. Thus, Hmin changes with pitch angle θ such that it moves toward and to the trailing edge of the slider 26, as the slider fly height increases.

The minimum spacing between the protective overcoat 40 and the disk surface, for a given pitch angle θ and slider crown δ, is given by the formula:

$$d = hg + x\theta + ((4\delta^* x^* (x-L))/L^2) - t$$

where:
  d is the minimum distance between the protective overcoat and the disk surface;
  hg is the distance between the trailing edge of the slider and the disk;
  x is the spacing between the trailing edge of the protective overcoat and the trailing edge of the slider;
  θ is the pitch angle of the slider;
  δ is the slider crown;
  L is the length of the slider; and
  t is the thickness of the protective overcoat.

The above formula can be used to design the dimensions of a slider to achieve the advantages of the present invention. The spacing x can be determined to minimize the magnetic distance between the transducer mounted at the trailing edge of the slider and the disk surface at the operating rotational velocity of the disk drive.

Figure 4:
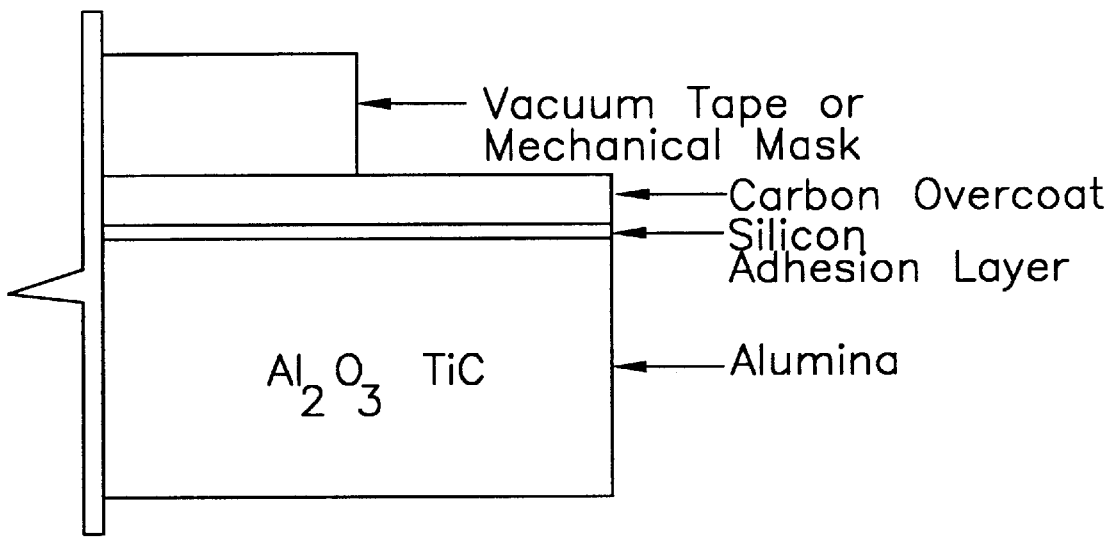
FIG. 4 is a side view of a slider in a manufacturing process to apply the protective overcoat according to the present invention.

The present invention also provides a method for manufacturing a slider having a protective overcoat with a length dimension that is less than the length dimension of the slider. Referring to FIG. 4, a vacuum tape or mechanical mask is applied to a slider at the row level of a known manufacturing process. As shown in FIG. 4, the slider has a carbon overcoat extending for the full length of the slider and the vacuum tape or mechanical mask is arranged to cover those portions of the overcoat that are to remain on the slider. In other words, the trailing edge of the vacuum tape or mechanical mask is spaced from the tailing edge of the slider by the distance x.

Those portions of the carbon overcoat extending beyond the vacuum tape or mechanical mask are removed. For example, an oxygen plasma etching technique is utilized to etch away those portions of the carbon overcoat that extend beyond the vacuum tape or mechanical mask. After application of the oxygen plasma etching technique, the vacuum tape or mechanical mask is removed to provide a slider according to the present invention, as illustrated in FIG. 5.

Figure 5:
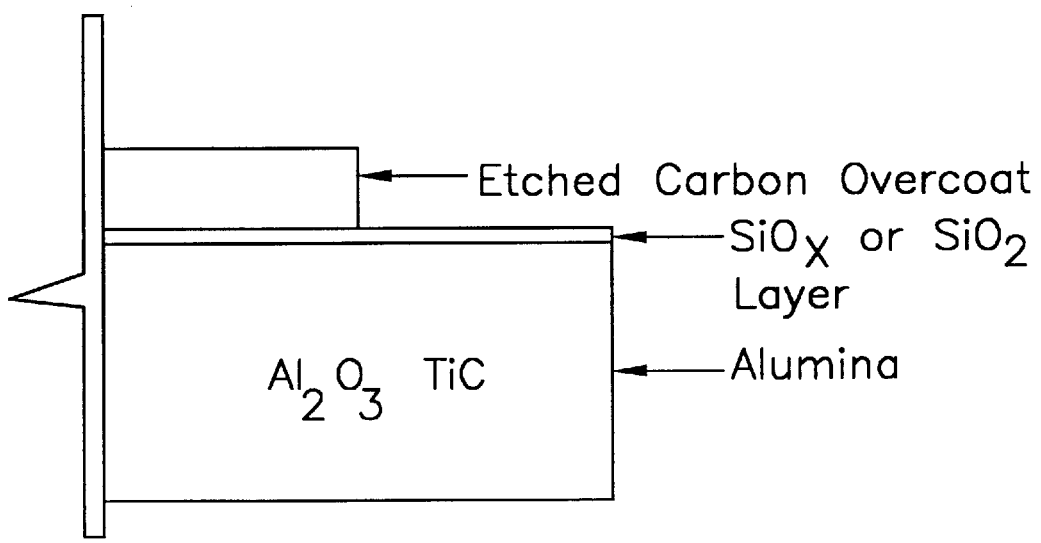
FIG. 5 is a side view of the slider of FIG. 4, after the manufacturing process.

As shown in each of FIGS. 4 and 5, a layer of Si is used as an adhesion layer to attach the carbon overcoat to the slider. Another advantage of the manufacturing process of the present invention is that a layer of $SiO_x$ or $SiO_2$ remains after the removal of the carbon overcoat from the trailing edge portions of the slider by the oxygen plasma etching technique. The $SiO_x$ or $SiO_2$ layer provides corrosion protection for the read/write gap. As shown in the figures, the thickness of the $SiO_x$ or $SiO_2$ layer is minimal when compared to the thickness of the carbon overcoat, and does not substantially impact the effective fly height of the read/write gap.

We claim:

1. A method for making a head for use in a disk drive, comprising the steps of:

providing a slider having a bottom air bearing surface, a leading edge and a trailing edge;

applying a protective overcoat to the entire bottom air bearing surface of the slider;

applying a mask to the protective overcoat;

arranging the mask to have a leading edge and a trailing edge, wherein the trailing edge of the mask is spaced from the trailing edge of the slider by a distance to expose portions of the protective overcoat extending beyond the trailing edge of the mask;

removing the portions of the protective overcoat extending beyond the trailing edge of the mask; and removing the mask, thereby defining a slider wherein the protective overcoat flies above the storage disk at a minimum distance d, according to the formula:

$$d = hg + x\theta + ((4\delta^* x^*(x-L)L^2) - t$$

where:

d is the minimum distance between the protective overcoat and the disk surface;

hg is the distance between the trailing edge of the slider and the disk;

x is the spacing between the trailing edge of the protective overcoat and the trailing edge of the slider;

$\theta$ is the pitch angle of the slider;

$\delta$ is the slider crown;

L is the length of the slider; and t is the thickness of the protective overcoat;

wherein the distance hg is less than the distance d when the value of $\theta$ is above a preselected value and the distance hg is greater than the distance d when the value of $\theta$ is below the preselected value.

2. The method of claim 1, wherein the step of removing the portions of the protective overcoat extending beyond the trailing edge of the mask is carried out by using an etching technique.

3. The method of claim 2, wherein the etching technique comprises an oxygen plasma etching technique.

4. The method of claim 1, wherein the mask comprises a mechanical mask.

5. The method of claim 1, wherein the protective overcoat comprises carbon.

6. The method of claim 1, comprising the further step of applying a layer of adhesion material to the entire bottom air bearing surface of the slider to affix the protective overcoat to the slider and wherein the layer of adhesion material remains after removal of the portions of the protective overcoat extending beyond the trailing edge of the mask.

7. The method of claim 6, wherein the layer of adhesion material comprises Si.

8. The method of claim 7 wherein the layer of Si adhesion material remains after removal in a form of $SiO_x$.

* * * * *